United States Patent

Buisker

[15] 3,674,122
[45] July 4, 1972

[54] MAGNETIC FRICTION CLUTCH-BRAKE UNIT

[72] Inventor: Raymond A. Buisker, Rockford, Ill.
[73] Assignee: Warner Electric Brake & Clutch Company, South Beloit, Ill.
[22] Filed: Nov. 12, 1970
[21] Appl. No.: 88,758

Related U.S. Application Data

[63] Continuation-in-part of Ser. No. 808,089, March 18, 1969.

[52] U.S. Cl. ............... 192/113 A, 192/18 B, 192/84 C, 188/264 A
[51] Int. Cl. ............... F16d 13/72
[58] Field of Search ............... 192/12 D, 18 B, 84 C, 112, 192/113 A; 188/264 A, 264 CC, 218 A, 161

[56] References Cited

UNITED STATES PATENTS

| 2,375,783 | 5/1945 | Gilfillan | 192/84 C |
| 2,724,281 | 11/1955 | Summerset al | 192/84 C |
| 3,240,302 | 3/1966 | Tuyl | 192/113 A |

*Primary Examiner*—Benjamin W. Wyche
*Assistant Examiner*—Randall Heald
*Attorney*—Wolfe, Hubbard, Leydig, Voit & Osann

[57] ABSTRACT

The magnet cores of a magnetically controlled friction clutch and brake are surrounded by and disposed in intimate heat-conducting contact with annular heat sinks which dissipate large quantities of heat from the clutch and brake by conducting the heat to and sinking the heat in a thermally conductive housing. The latter completely encases the operating elements of the clutch and brake and establishes a dust-tight enclosure around the elements so as to prevent both contamination from entering and wear particles from escaping the housing.

6 Claims, 9 Drawing Figures

PATENTED JUL 4 1972

INVENTOR
Raymond A. Buisker
By Wolfe, Hubbard, Voit & Osann
ATTORNEYS

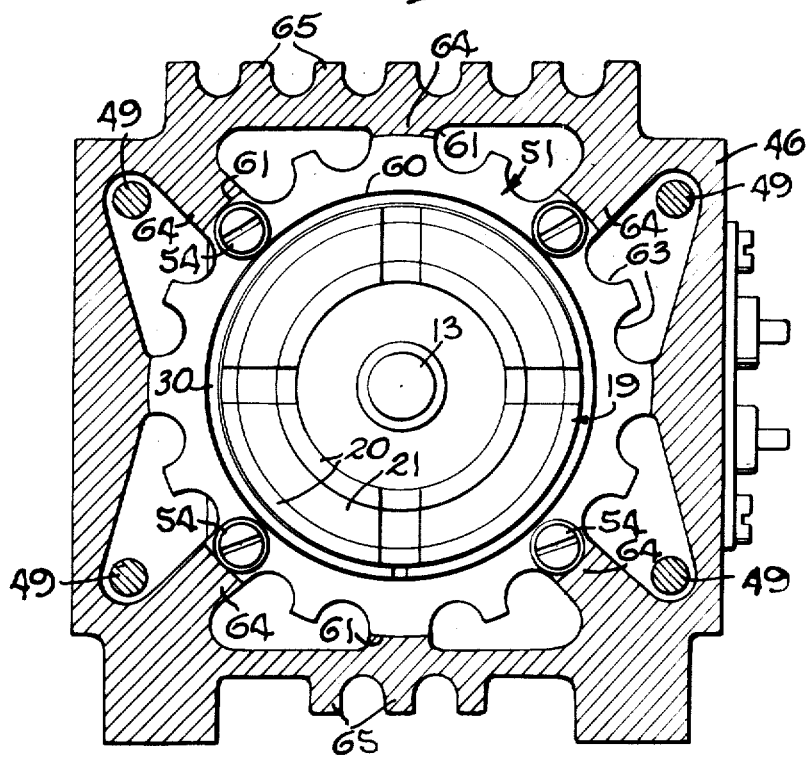
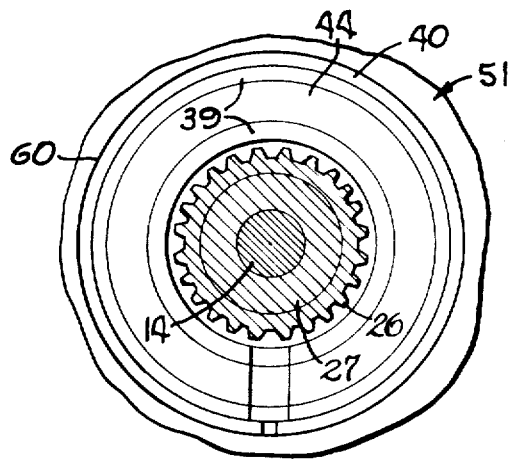
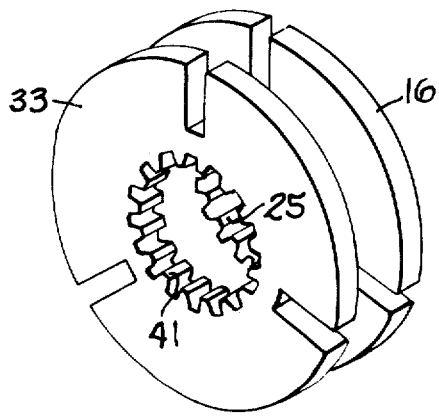

INVENTOR
Raymond A. Buisker
By Wolfe, Hubbard, Leydig, Voit & Osann
ATTORNEYS 3,674,122

MAGNETIC FRICTION CLUTCH-BRAKE UNIT

CROSS-REFERENCE TO A RELATED APPLICATION

This application is a continuation-in-part of my copending application Ser. No. 808,089, filed Mar. 18, 1969.

BACKGROUND OF THE INVENTION

This invention relates to magnetically controlled friction couplings of the type having a stationarily mounted magnet core and relatively rotatable field and armature rings with friction surfaces which are drawn into axial gripping engagement to produce a clutch or braking action in response to magnetic flux threading a toroidal path through the core and rings. The flux is produced as an incident to the energization of an electrical winding associated with the core. Considerable heat is created as a result of the frictional engagement between the rings and the electrical heating of the coupling winding, particularly under high cycle rate conditions, and the service life and performance ability of the coupling are dependent upon the effective dissipation of such heat.

SUMMARY OF THE INVENTION

The primary aim of the present invention is to dissipate more heat away from a coupling of the above character than has been possible heretofore by encasing the core and the rings with a thermally conductive housing and by effectively transferring large quantities of heat from the core and sinking the heat into the housing by conduction thereby to cool the coupling. A further object is to sink sufficient heat from the coupling and into the housing by conduction so as to avoid the need of circulating cooling air through the coupling and thereby enable the core and rings to be completely enclosed by the housing and sealed off from their operating environment. In this way, contamination is prevented from entering the coupling, wear particles are prevented from escaping from the coupling, and the coupling runs quieter in service use.

The invention also resides in the provision of a novel heat sink encircling the core to conduct heat from the core to the housing along parallel paths, and in the unique construction and mounting of one embodiment of the heat sink to establish intimate conductive contact with the core and the housing while enabling manufacture and assembly of the sink by rapid and low cost production techniques.

Other objects and advantages of the invention will become apparent from the following detailed description when taken in conjunction with the accompanying drawings.

BRIEF DESCRIPTION OF THE DRAWINGS

FIG. 3 is a cross-section taken substantially along the line 3—3 of FIG. 1.

FIG. 4 is a fragmentary cross-section taken substantially along the line 4—4 of FIG. 1.

FIG. 5 is a perspective view of the armature rings of the coupling shown in FIG. 1.

DETAILED DESCRIPTION OF THE PREFERRED EMBODIMENT

Figure 1:
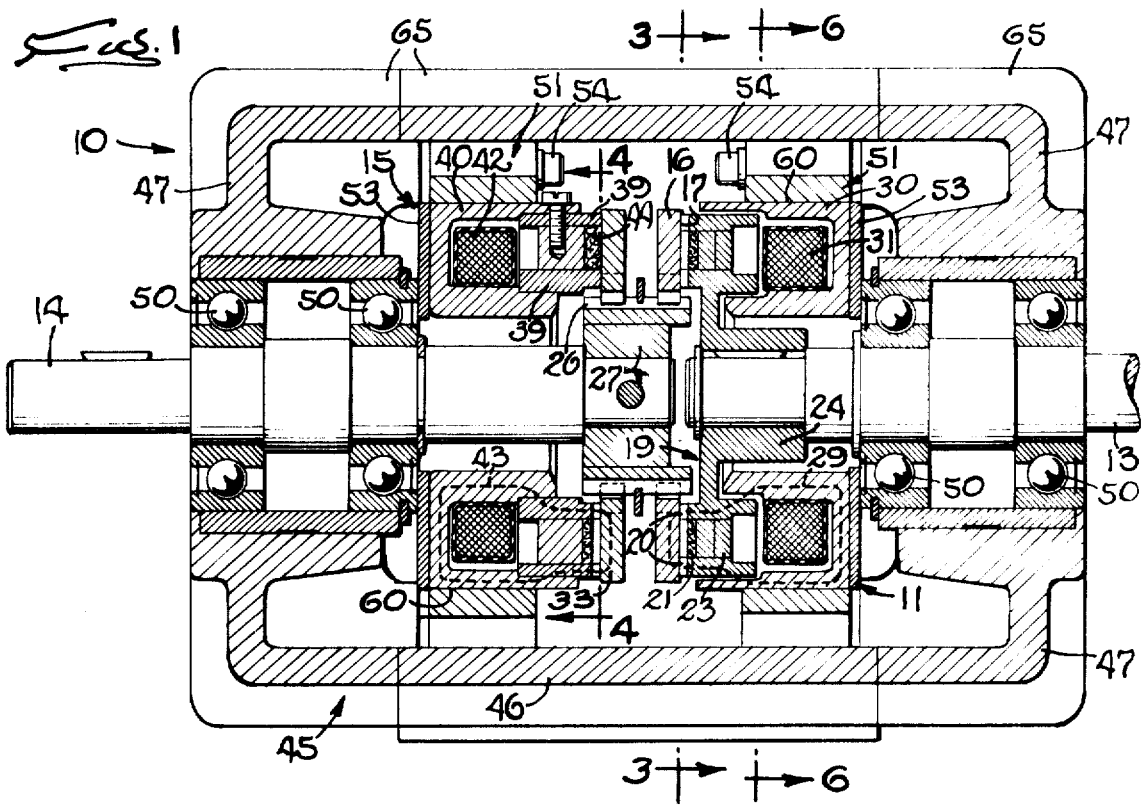
FIG. 1 is a cross-sectional view of one embodiment of a new and improved coupling incorporating the novel features of the present invention, the section being taken substantially along the line 1—1 of FIG. 2.

As shown in the drawings for purposes of illustration, the invention is incorporated in a magnetically controlled friction coupling 10 (FIG. 1) herein in the form of a clutch-brake unit having a clutch 11 which is selectively energizable to couple and transmit torque from a rotatable driving shaft 13 to a driven shaft 14 and having a brake 15 which is selectively energizable to arrest rotation of the driven shaft. The clutch and brake usually are complementally actuated in that the brake is de-energized to release the driven shaft when the clutch is energized to transmit torque, and then is energized to stop rotation of the driven shaft when the clutch is de-energized to uncouple the shafts.

In this instance, the clutch 11 includes a driven element in the form of a flat disc or ring 16 (FIG. 1) constituting an armature whose surface 17 is adapted for axial gripping engagement with a driving ring 19 comprising concentric pole pieces 20 terminating in axial faces spanned by the armature ring and separated by segments 21 of non-magnetic friction material whose outer surface is substantially flush with the pole faces. The pole pieces, which are composed of relatively soft iron, are rigidly joined by a non-magnetic filling 23 such as copper, and the inner pole piece is carried by a hub 24 keyed to the driving shaft 13.

The armature ring 16 is made of iron and is formed with angularly spaced and inwardly projecting radial teeth 25 (FIG. 5) fitting closely in but slidable along spline grooves 26 (FIG. 1) angularly spaced around the exterior of a collar 27 fast on the driven shaft 14. Thus, the armature ring is adapted for axial sliding along the driven shaft and into gripping engagement with the friction face of the driving ring 19. Such gripping engagement to derive a friction torque is produced by magnetic flux threading a toroidal circuit 29 (shown by the dotted line in FIG. 1) formed by the armature ring 16 and by the pole pieces 20, the latter telescoping closely with the concentric pole pieces of a stationary annular core 30 made of magnetic material such as iron and having a U-shaped radial cross-section. Magnetic flux for actuating the clutch is produced in this instance by energization of a multiple turn winding 31 enclosed by the core.

Like the clutch armature ring 16, an armature ring 33 (FIGS. 1 and 5) for the brake 15 is formed herein as a flat annular disc of magnetic material spanning and adapted for frictional gripping engagement with axially facing surfaces of concentric ring-like pole pieces 39 attached rigidly to the ends of a stationary annular brake magnet core 40 made of magnetic material and formed with a U-shaped radial cross-section. The armature ring 33 is formed with inwardly projecting radial teeth 41 (FIG. 5) and is splined to the collar 27 on the driven shaft 14 for rotation with and axial sliding along the shaft. Upon energization of a multiple turn annular winding 42 seated within the core 40, magnetic flux threads a toroidal circuit 43 (shown in dotted lines in FIG. 1) formed by the core, the pole pieces 39 and the armature ring 33 to draw the latter into axial gripping engagement with the pole pieces and a ring 44 of wear resistant material seated between pole pieces. Rotation of the driven shaft thus is retarded.

When the clutch winding 31 is energized repeatedly at fast cycle rates to draw the armature ring 16 into gripping engagement with the driving ring 19, considerable heat is generated as a result of the rubbing friction which occurs between the engaging surfaces each time the driven shaft 14 begins to rotate and accelerate to the same speed as the driving shaft 13. Heat similarly is generated when the brake winding 42 is energized at rapid intervals to cause the pole pieces 39 and wear ring 44 to frictionally engage and rub against the armature ring 33 to stop rotation of the driven shaft. Also, substantial heat is created electrically within the clutch and brake windings when the latter are energized. The performance ability, cycle capacity and service life of the coupling 10 are adversely affected by such heat and improve in proportion to the amount of heat that can be dissipated to reduce the temperature of the coupling.

In accordance with the present invention, the magnet cores 30 and 40 of the clutch 11 and the brake 15 are disposed in intimate heat-conducting relation with substantial areas of a thermally conductive housing 45 which surrounds the cores and the other elements of the clutch and brake and which acts as a massive heat sink to dissipate large quantities of heat from within the coupling 10 by conduction so as to allow the coupling to run at lower operating temperatures than prior couplings of the same general type. Moreover, I have discovered that sufficient heat can be conducted away from the coupling by sinking the heat into the housing that it is not necessary to provide openings in the housing for the passage of cooling air and thus I have constructed the housing as a dust-tight enclosure which completely encases the elements of the coupling to prevent contaminants from either entering into or escaping from the coupling. Thus, the coupling not only runs cooler during service use but also is better isolated with respect to its operating environment.

In the present instance, the housing 45 comprises an open-ended casing 46 (FIGS. 1 and 3) surrounding the elements of the clutch 11 and the brake 15 and made of thermally conductive material such as aluminum. The casing is formed with a generally rectangular cross-section and is closed at its ends by correspondingly shaped end bells 47 which also are made of aluminum and which are attached to the casing by screws 49 (FIGS. 2 and 3). Bearings 50 (FIG. 1) are fitted into openings in the end bells and serve to journal the driving and driven shafts 13 and 14 for rotation about a common axis.

Advantageously, ring-like heat sinks 51 (FIGS. 1, 6 and 7) are fitted over the clutch and brake magnet cores 30 and 40 and are telescoped removably into the casing 46 to establish within the casing comparatively large conductive masses for drawing heat away from the operative elements of the clutch 11 and the brake 15 and for conducting the heat rapidly from the cores to the casing along parallel paths. The heat sinks 51 herein are made of aluminum, are generally cylindrical in shape, and are formed with center openings which are sized to receive the cores. Each core is welded securely to a rectangular supporting plate 53 (FIGS. 1 and 7) which lies alongside the outboard end of the respective sink when the latter is telescoped over the core. Screws 54 (FIGS. 1 and 3) extend through holes 55 (FIG. 7) in the sinks and the supporting plates and are threaded into the end bells 47 to anchor the sinks, the plates and the cores rigidly within the housing 45.

Figure 2:
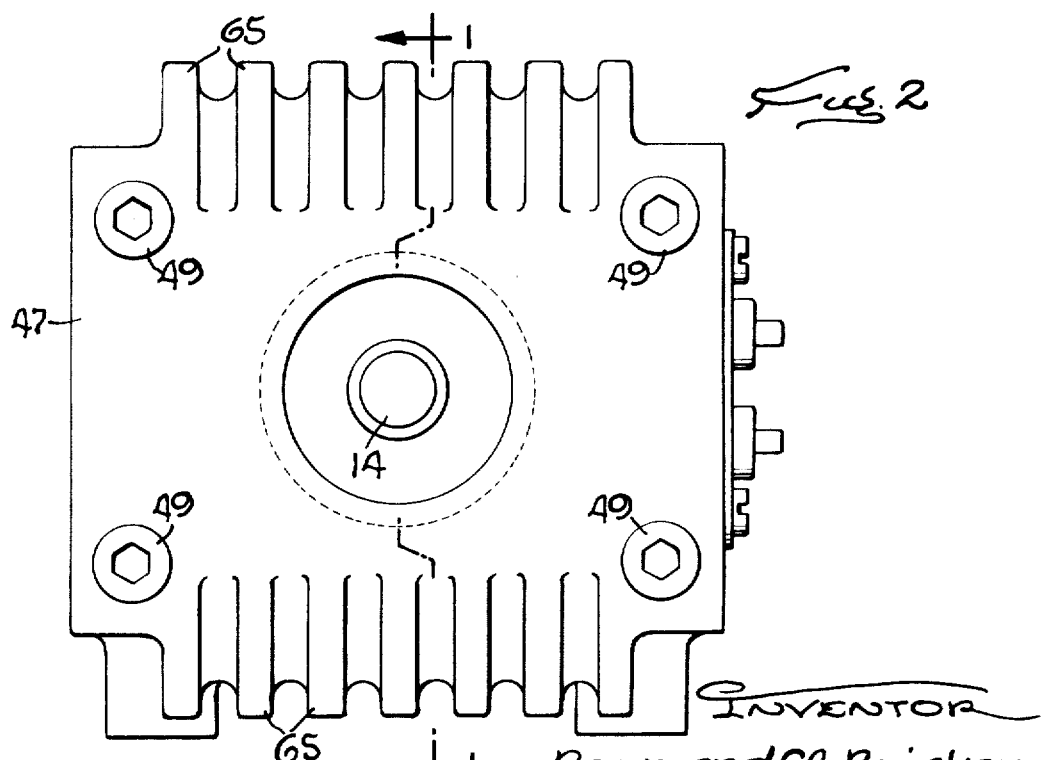
FIG. 2 is an end view of the coupling shown in FIG. 1.
Figure 6:
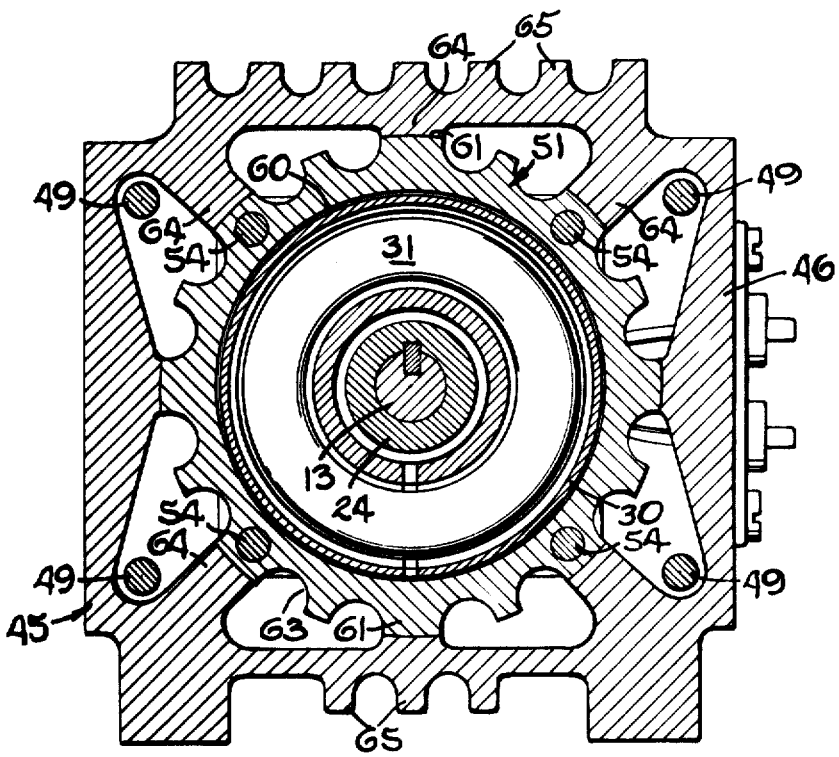
FIG. 6 is a cross-section taken substantially along the line 6—6 of FIG. 1.
Figure 7:
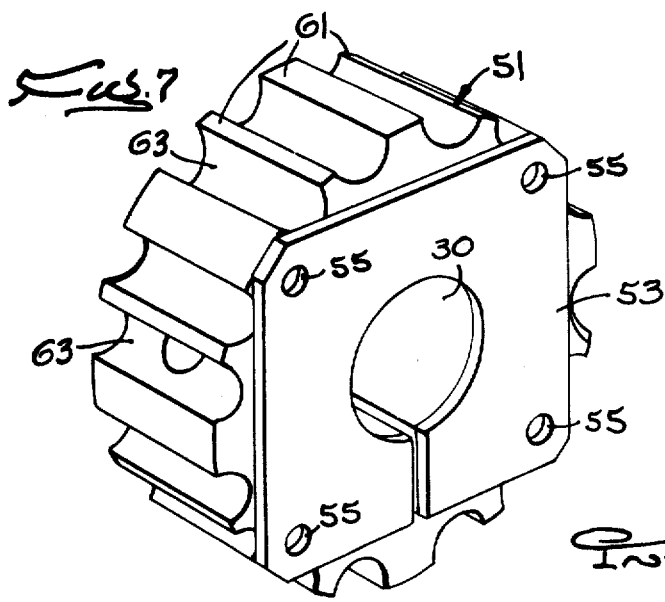
FIG. 7 is a perspective view primarily illustrating one of the heat sinks of the coupling shown in FIG. 1.

As shown most clearly in FIGS. 1 and 6, the sinks 51 completely encircle the cores 30 and 40 and are disposed with their outer peripheral surfaces in heat-conducting contact with the inner wall of the casing 46. Intimate conduction is advantageously established between each core and sink by a lining 60 (FIG. 6) of thermally conductive compound such as that sold by trade designation No. 122 by Wakefield, Inc. of Wakefield, Massachusetts, the compound being sandwiched between the opposing annular surfaces of the core and sink to fill the voids and air spaces between such surfaces and thereby enhance the conductive transfer of heat from the core to the sink. The compound, which is initially pliable, is applied to the opposing surfaces of the core and the sink just before the former is telescoped into the latter, and then sets up and hardens to establish the thermally conductive lining between the surfaces. In addition to promoting better heat transfer, the compound eliminates the need for manufacturing the core and the sink to close tolerances and for establishing a precise press-fit between the two. The cores and sinks thus may be sized for quick and easy assembly and yet will always be disposed in intimate conducting relation.

To enable telescoping of the heat sinks 51 into good heat-conducting contact with the casing 46 without need of precisely sizing the sinks and the casing, the outer periphery of each sink is formed with a series of angularly spaced lands 61 (FIG. 7) which are separated by intervening grooves 63. Every other land is disposed in mating face-to-face contact with a projection or pad 64 (FIG. 6) formed integrally with and projecting inwardly from the wall of the casing, there being such eight pads in this instance spaced angularly around each heat sink. With the periphery of each sink being formed with the alternating lands and grooves rather than as a smooth continuous surface and with the lands mating with the angularly spaced pads, the sinks may be telescopically pressed into heat-conducting contact with the casing without need of such a precisely concentric fit as would be necessary to mate uninterrupted annular surfaces. Accordingly, the sinks may be fitted quickly and easily into intimate contact with the casing in spite of dimensional inaccuracies which might occur in the sinks and casing as a result of their manufacture by comparatively rapid and low cost production techniques.

With the foregoing arrangement, heat created by the frictionally engaged elements of the clutch 11 and brake 15 and by the electrical windings 31 and 42 is drawn to the magnet cores 30 and 40 and transferred by conduction to the heat sinks 51 by virtue of the relatively large conductive mass established within the casing 46 by the sinks. The sinks conduct the heat to the casing along parallel paths through the lands 61 and the pads 64 and the casing, constituting a comparatively large conductive mass, thus itself acts as a large heat sink. Preferably, fins 65 (FIGS. 2 and 3) are formed on the outer sides of the casing and the end bells 47 to increase the exposed surface area thereof and thereby facilitate dissipation of heat from the exterior of the housing 45 by convection and radiation. It has been found that a significantly greater quantity of heat is dissipated from the coupling 10 of the present invention than from a comparable coupling of the conventional open-type design which is cooled primarily by convection. As a result, the present coupling runs cooler, is capable of operating with more frequent cycling and more uniform response, and experiences a longer service life since wear caused by heat is reduced.

Because the coupling 10 is cooled without the need of circulating cooling air through the housing 45, the elements of the clutch 11 and brake 15 are completely enclosed by the housing. Thus, the end bells 47 are fastened to the casing 45 with a dust-tight seal, and no uncovered openings are present in the casing or end bells. Accordingly, wear particles falling from the friction surfaces simply gravitate to the bottom of the casing and are prevented from escaping to the outside environment. This is particularly advantageous when the coupling is used in conjunction with business machines with intricate operating mechanisms which could become fouled by the wear particles. Also, the dust-tight enclosure formed by the housing prevents outside contamination from entering the coupling and results in quieter operation of the coupling in service use.

Figure 8:
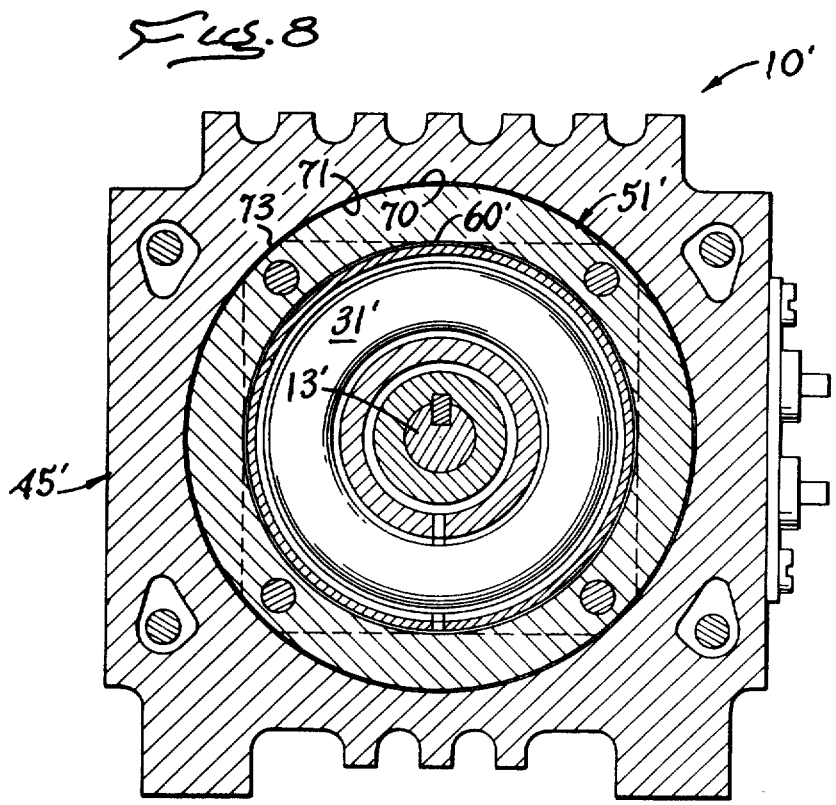
FIG. 8 is a view similar to FIG. 6 but showing a second embodiment of a coupling incorporating the features of the invention.
Figure 9:
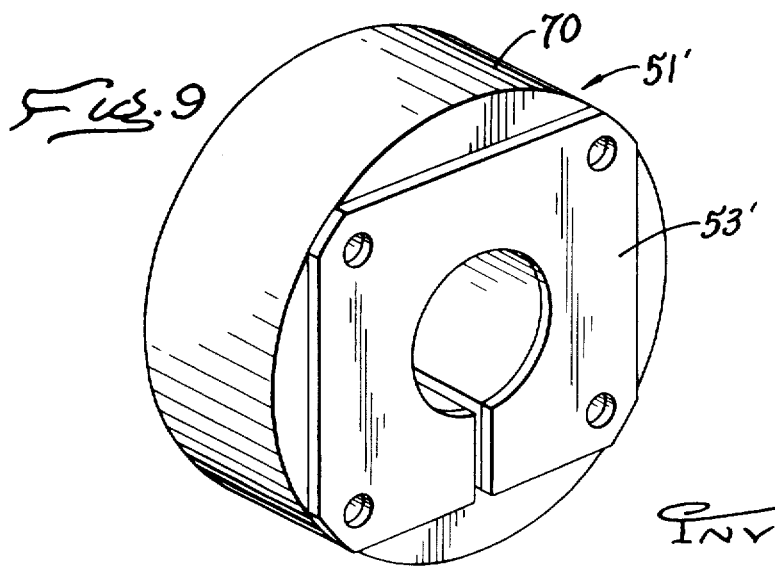
FIG. 9 is a perspective view of one of the heat sinks of the coupling shown in FIG. 8.

A modified coupling 10' is shown in FIGS. 8 and 9 in which elements corresponding to those of the first embodiment are indicated by the same but primed reference numerals. In this instance, each of the heat sinks 51' is formed with a smooth and uninterrupted outer surface 70 which is telescoped into and opposed by a continuous annular wall 71 defined within the housing 45'. As before, a lining 60' of thermally conductive compound is disposed between the inner surface of the sink and the outer surface of the magnet core and, in addition, a similar thermally conductive lining 73 is placed between the outer surface 70 of the sink and the inner wall 71 of the housing to fill the voids and air spaces and thus establish intimate heat conducting relation between the sink and the housing. Although the surface 70 and the wall 71 must be machined to closer tolerances than the mating surfaces of the lands 61 and the pads 64, the heat does flow through the sink 51' and into the housing along a greater number of parallel paths than is the case when the sink 51 is employed because the surfaces 70 and 71 are in conducting relation around their entire circumferences.

I claim as my invention:

1. A magnetically controlled friction coupling having an annular magnet core and an armature ring mounted for relative rotation about a common axis with the ring adapted to be gripped axially in response to magnetic flux threading a toroidal path through the core and the ring, a housing of thermally conductive material completely encasing said core and said ring and defining a dust-tight enclosure around the core and the ring, a heat sink of thermally conductive material fitted over and encircling said core and telescoped removably into said housing, the outer periphery of said heat sink being formed with angularly spaced lands with intervening grooves, a plurality of inwardly projecting pads formed integrally with and spaced angularly around the inner wall of said housing and having inner surfaces disposed in face-to-face conductive contact with said lands, and a lining of thermally conductive compound between said core and said heat sink and filling the voids between opposing surfaces of the core and sink to establish intimate conductive heat transfer between the two whereby heat produced by said coupling is dissipated and conducted away from said core to said housing through said compound and said sink.

2. A magnetically controlled friction coupling having an armature ring and an annular core of magnetic material mounted for relative rotation about a common axis with the ring adapted to be gripped axially in response to magnetic flux threading a toroidal path through the core and the ring, a housing of highly thermally conductive material completely encasing said ring and said core, and an annular, ring-like heat sink made of a material more highly thermally conductive than the material of said core, said heat sink being disposed within said housing with the inner periphery of the sink encircling and intimately contacting said core to conduct heat radially from the core to the sink, the outer periphery of said heat sink being in intimate conductive contact with said housing around at least a plurality of circumferentially spaced points around substantially the entire outer periphery of the sink and conducting heat radially from the sink to the housing along at least a plurality of radially extending and circumferentially spaced paths whereby heat produced by the coupling is dissipated by way of said heat sink and said housing.

3. A coupling as defined in claim 2 in which said heat sink is telescoped removably into said housing and is telescoped over said core.

4. A coupling as defined in claim 3 further including a lining of thermally conductive compound between said core and said heat sink and filling the voids between opposing surfaces of the core and said sink to establish intimate conductive heat transfer between the two.

5. A magnetically controlled friction coupling having an armature ring and an annular magnet core of U-shaped radial cross-section mounted for relative rotation about a common axis with the ring adapted to be gripped axially in response to magnetic flux threading a toroidal path through the core and the ring, the flux being produced upon energization of an annular winding disposed within the U of said core, a housing of thermally conductive aluminum completely encasing said core and said ring and defining a substantially dust-tight enclosure around the core and the ring, a heat sink of thermally conductive aluminum fitted over and encircling said core and telescoped removably into said housing, said heat sink comprising a ring-like member with a greater volume of material than said core and having an outermost annular surface disposed in intimate conductive contact with the inner face of said housing along the entire axial length of such surface and around at least a plurality of angularly spaced points around the circumference of said inner face, said heat sink having an innermost annular surface substantially coextensive in axial length with said outermost surface and disposed in intimate conductive contact with the outer surface of said core with said innermost surface completely encircling said core and axially spanning and surrounding the entire axial length of said winding whereby heat produced by said coupling is dissipated and conducted away from said core to said housing by and through said heat sink.

6. A magnetically controlled friction coupling having an armature ring and an annular core of magnetic material mounted for relative rotation about a common axis with the ring adapted to be gripped axially in response to magnetic flux threading a toroidal path through the core and the ring, a housing of highly thermally conductive material completely encasing said ring and said core, and an annular, ring-like heat sink made of a material more highly thermally conductive than the material of said core, said heat sink being telescoped removably into said housing with the inner periphery of the sink encircling and intimately contacting said core to conduct heat radially from the core to the sink, the outer periphery of said heat sink being formed with angularly spaced lands with intervening grooves, a plurality of inwardly projecting pads formed integrally with and spaced angularly around the inner wall of said housing and having inner surfaces disposed in face-to-face contact with said lands, said lands and said pads conducting heat radially from the sink to the housing along a plurality of radially extending and circumferentially spaced paths whereby heat produced by the coupling is dissipated by way of said heat sink and said housing.

* * * * *